S. S. Hartshorn,

Buckle,

No. 2,955, Reissued May 26, 1868.

N. PETERS, PHOTO-LITHOGRAPHER, WASHINGTON, D. C.

United States Patent Office.

THE WEST HAVEN BUCKLE COMPANY, OF WEST HAVEN, ASSIGNEES OF SHELDON S. HARTSHORN, OF ORANGE, CONNECTICUT.

*Letters Patent No.* 11,892, *dated November* 7, 1854; *reissue No.* 2,955, *dated May* 26, 1868.

IMPROVEMENT IN BUCKLES.

The Schedule referred to in these Letters Patent and making part of the same.

TO ALL WHOM IT MAY CONCERN:

Be it known that SHELDON S. HARTSHORN, of Orange, in the county of New Haven, and State of Connecticut, has invented a new Improvement in Buckles; and we do hereby declare the following, when taken in connection with the accompanying drawings, and the letters of reference marked thereon, to be a full, clear, and exact description of the same, and which said drawings constitute part of this specification, and represent, in—

Figure 1:
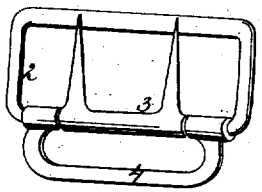
Figure 2:
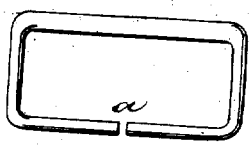
Figure 4:
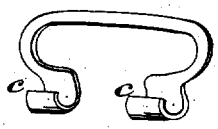

Figure 1, the buckle complete,

Figure 2, one of the loops,

Figure 4, the other loop; and, in

Figure 3:
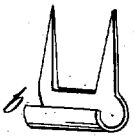

Figure 3, the tongue.

This invention relates to an improvement in that class of buckles designed for use in wearing-apparel, and for like purposes, and consists in bending or forming the one part (the frame or loop) so that its two ends nearly or quite meet each other, and the two ends so meeting clasped by the tongue, so that the said clasping of the tongue, while it forms a hinge for the tongue, serves to sustain that part or side which is so clasped by the tongue; also, in combining therewith a third part, or second loop, hinged to the same part or side as the tongue, and yet independent of the tongue, so that the three parts are movable, each independent of the other.

In order to the clear understanding of this invention, we will fully describe the same, as illustrated in the accompanying drawings.

The first part, the frame or loop, as represented in fig. 2, is formed by bending (or otherwise) the metal, so that the two ends meet, or nearly so, at *a*. The tongue, represented in fig. 3, is formed so that the base of the tongue may be bent around, so as to clasp upon the divided side, as seen in fig. 1, and thus, while the divided side forms a pintle, upon which the tongue is hinged, the tongue itself, clasping the divided side, sustains that side, and thus avoids the necessity of soldering, or otherwise uniting, the meeting ends. The number of tongues upon the base depends, of course, upon the length of the buckle or use to which it is adapted, the invention being to so clasp the divided side, by the base or hinge of the tongue, as to sustain the divided side, as before described. With the buckle thus described is combined a loop, (seen in fig. 4,) bent or formed so that its two ends may clasp the divided side, as seen in fig. 1, and so as to form a hinge between the two parts, and so that each part will move, the one independent of the other.

If the buckle be formed in two parts, that is, of the parts figs. 2 and 3, then, of course, the divided side will be one side of the frame; but if composed of three parts, then the divided side, as will be readily seen, will be either the frame of the buckle or loop, it being only necessary that the points of the tongue be turned either upon the one or the other, to form the loop of one or frame of the other, or *vice versa*. By this means is produced a cheap and durable buckle.

Having thus fully described this invention, what we claim as the invention of the said SHELDON S. HARTSHORN, and desire to secure by Letters Patent, is—

1. A buckle, in which the tongues are formed from a single piece of metal, and constructed so as to clasp the divided side, and turn freely thereon, substantially in the manner herein set forth.

2. The combination of the two parts or loops, one side of one of which is divided, and the two parts or loops hinged together, as described, and the tongue clasped and hinged upon the divided side, substantially as set forth.

THE WEST HAVEN BUCKLE COMPANY,
*Assignees by Mesne Assignments of S. S. Hartshorn,*
By GEO. R. KELSEY, *Treasurer.*

Witnesses:
J. H. SHUMWAY,
A. J. TIBBITS.